F. M. DAVIS.
DUPLEX MILLING MACHINE.
APPLICATION FILED FEB. 10, 1917.

1,279,286.

Patented Sept. 17, 1918.
2 SHEETS—SHEET 1.

INVENTOR.
Frank M. Davis
R. S. Caldwell.
ATTORNEY

WITNESSES
H. B. Chase

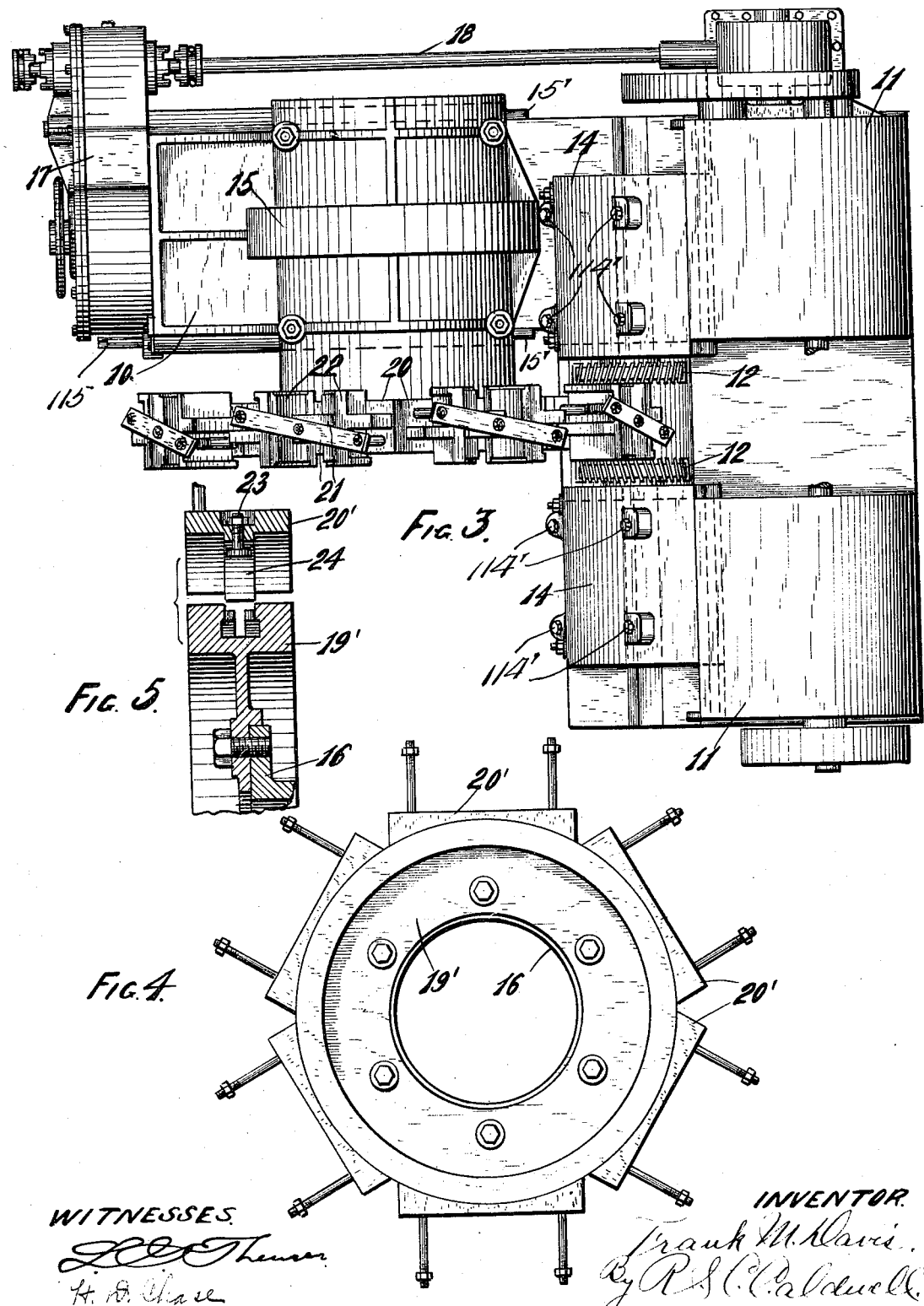

UNITED STATES PATENT OFFICE.

FRANK M. DAVIS, OF MILWAUKEE, WISCONSIN.

DUPLEX MILLING-MACHINE.

1,279,286.    Specification of Letters Patent.    Patented Sept. 17, 1918.

Application filed February 10, 1917. Serial No. 147,911.

*To all whom it may concern:*

Be it known that I, FRANK M. DAVIS, a citizen of the United States, and resident of Milwaukee, in the county of Milwaukee and State of Wisconsin, have invented new and useful Improvements in Duplex Milling-Machines, of which the following is a description, reference being had to the accompanying drawings, which are a part of this specification.

This invention relates to milling machines for use in large factories turning out numerous standardized parts and is designed for rapidly and simultaneously facing opposite sides of like pieces of work. It consists of a continuously driven table carrying the work between opposite pairs of milling heads to produce a roughing cut and then a finishing cut in the single cycle of travel and permitting the finished work to be replaced by new work without stopping the machine.

Another object of the invention is to produce such a continuously rotated table which may be easily replaced with another having a different arrangement of work holding jigs thereon, so that the change may be made from one article of work to another without loss of time in changing the jigs.

A further object of the invention is to so construct a work feeding table for such duplex milling machines that the work holding jigs may be slidably adjusted thereon in a circular path and thus be positioned close together to permit the machine to operate at full capacity whether the work is of one size or another and avoid unnecessary loss of time incident to an increase in the space between successive pieces of work when the work is small and the jig positions are fixed.

With the above and other objects in view the invention consists in the duplex milling machine as herein claimed and all equivalents.

Referring to the accompanying drawing in which like characters of reference indicate the same parts in the different views:

Fig. 3 is a plan view;

Fig. 4 is a detail view of a work feeding table removed from the machine and capable of having the work holding jigs adjustable in their positions thereon; and Fig. 5 is a detail sectional view of a part of such work feeding table showing the means for clamping the jigs in their adjustments.

Figure 1:
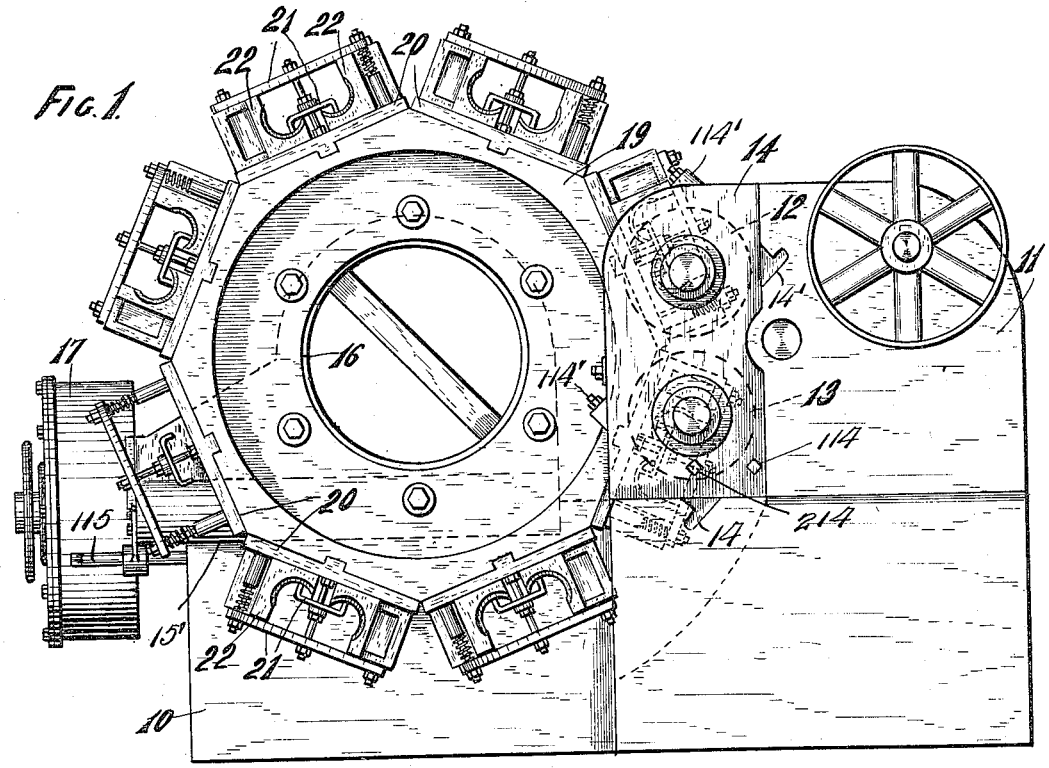
Figure 1 is a front view of a duplex milling machine of this invention showing the rotary work feeding table.

In these drawings 10 indicates a base on which is mounted the casing 11 containing the reduction gearing for the milling cutters 12 and 13 which are mounted in pairs on two slidable housings 14 adjustable toward and from each other in suitable ways 14' in the casing and base respectively. The two upper cutters 12 are roughing cutters and have their axes in alinement while the two lower cutters are finishing cutters and also have their axes in alinement. Adjusting screws 114 are provided for sliding the housings 14 in their ways and clamping screws 114' serve to lock them in their adjustments.

On the angular projection of the base 10 is slidably mounted in ways 15' a housing 15 in which is mounted a large tubular arbor 16 rotated by a clutch controlled worm gear driving means 17 sliding on a splined shaft 18 from the gear casing 11. The housing 15 is moved in its ways by means of a feed screw 115.

Bolted, or otherwise removably fastened, to the annular flange of arbor 16 is a ring-like work table 19 with work holding jigs 20 suitably secured to its periphery which is of the shape of a polygon with as many sides as there are jigs, according to the length of the jigs suited to the work being operated upon. The jigs 20 are preferably keyed on the jig seats of the work table and are provided with clamping plates 21 to firmly clamp the work 22 in place.

The adjustments of the work feeding table support 15 along the longitudinal horizontal ways of the base 10 permit the rotary work feeding table to be moved between the cutter heads 12 and 13 so that the path of travel of the work 22 will carry it between both sets of cutter heads in such a manner that all of the end surface thereof which is to be dressed is subjected to the action of the roughing cutters and then of the finishing cutters. The adjustment of each cutter housing 14 on the transverse horizontal ways 14' and the longitudinal adjustment of the lower cutter spindle in said housing by means of adjusting screw 110

214 permit of the cutter heads being accurately positioned to produce the desired depth of cut and accurately determine the length of the finished work from one dressed face thereof to the other.

In operation, the rotation of the work feeding table is continuous and at such a speed that the attendant is kept busy in removing the finished work from the jigs and clamping new work in place therein. This change is made when the jigs are in convenient position and without interrupting the rotary movement of the table. By means of the continuously moving rotating work feeding table of this invention the cutters are kept constantly at work and are not required to run idle while the finished work is being replaced and the operator is kept engaged instead of having to wait for the operation of the cutters. The capacity of the machine is greatly increased, while the cost of production is reduced and the work is finished in shorter time.

In changing from one standard piece of work to another it is found desirable to replace the entire work feeding table with another equipped with the jigs for the new piece of work rather than to replace the jigs on the same table and this may easily be done by removing the clamping bolts holding the table on the flange of the arbor.

Figure 2:
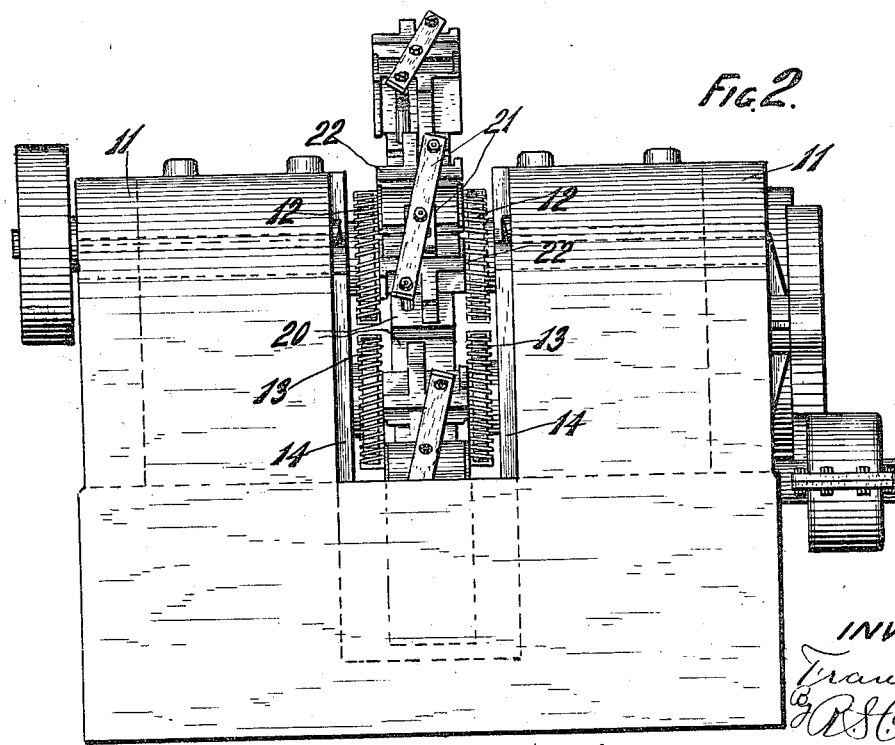
Fig. 2 is an end view thereof showing the opposite milling cutters in successively operating pairs.

Such a spare or supplemental work feeding table is shown in Fig. 4 as a modification 19' of the form of table illustrated in Figs. 1, 2 and 3. This table is circular with a T-shaped slot extending around its periphery to take the heads of clamping bolts 23 which are carried by the jigs 20'. Each jig in this instance has its bottom surface curved to fit the round rim of the table with a central key flange 24 fitting in the T-shaped slot to assist in holding it in place. One or more of the jigs 20' may be removed and the others shifted to stand the same distance apart, or jigs of different lengths may be substituted in order to accommodate work of any size without spacing several pieces of work apart more than is necessary, it being an object to arrange the pieces or work close together and avoid spaces in which the cutters will be out of engagement with the work.

It is to be understood that the invention is not limited to any specific form or arrangement of parts except in so far as such limitations are specified in the claims.

What I claim as new and desire to secure by Letters Patent is:

1. A duplex milling machine, comprising oppositely positioned cutters independently mounted and spaced apart, a rotary table adjustably mounted to move between the cutters, means for securing the work on the table, and means for giving the table a continuous rotary movement to feed the work in a circular path which will carry it between the cutters, said securing means permitting the work to be removed and replaced during the turning movement of the table.

2. A continuous feed mechanism for duplex milling machines which have oppositely positioned spaced cutters independently mounted, comprising a suitably driven arbor, a work table detachably mounted thereon and turning in a plane parallel with and between the cutters, means for adjusting the arbor to move the table nearer to or farther from the axes of the cutters, and means for clamping the work on the edge of the table to pass between the cutters in the rotary travel of the table and have its opposite faces cut thereby.

3. A duplex milling machine for universal application, comprising oppositely positioned spaced rotary cutters independently mounted and adjustable toward and away from each other, a rotary table on an axis parallel with the axes of the cutters and traveling in a plane between the cutters, means for adjusting the table with relation to the cutters for bringing its axis nearer to or farther from the axes of the cutters, and work holding means at the edges of the table for carrying the work between the cutters during the turning of the table.

4. A duplex milling machine, comprising oppositely positioned rotary cutters, a rotary table on an axis parallel with the axis of the cutters and in a plane between the cutters, and adjustable in said plane toward and away from the cutters, and work holding means at the edges of the table for carrying the work between the cutters during the circular travel of the table.

5. A duplex milling machine, comprising oppositely positioned rotary cutters adjustable toward and away from each other, a rotary table on an axis parallel with the axis of the cutters and in a plane between the cutters and adjustable in said plane toward and away from the cutters, and work holding means at the edges of the table for carrying the work between the cutters during the circular travel of the table.

6. A duplex milling machine, comprising pairs of oppositely positioned roughing and finishing cutters adjustable toward and away from each other, a rotary table on an axis parallel with the axes of the cutters and in a plane between the cutters and adjustable in said plane toward and away from the cutters, and work holding means at the edges of the table for carrying the work between the roughing cutters and then the finishing cutters during the circular travel of the table.

7. A duplex milling machine, comprising a base, a casing thereon containing driving gearing, cutter housings longitudinally adjustable on the base toward and away from each other, oppositely positioned cutters on the cutter housings, a table supporting housing slidably mounted on the base and adjustable toward and away from the cutters, a suitably driven arbor rotatably mounted in the table supporting housing, a table detachably secured to the arbor, and work holding means at the edges of the table for carrying the work between the cutters.

8. A duplex milling machine, comprising oppositely positioned rotary cutters, a suitably driven arbor parallel with the axis of the cutters, a table detachably mounted on the arbor, and work holding means at the edges of the table for carrying the work between the cutters.

9. In a continuous feed mechanism for duplex milling machines, a detachable circular table, and work holding jigs slidably connected at the periphery thereof and adapted to be adjusted toward and away from each other.

10. In a continuous feed mechanism for duplex milling machines, a circular table having a T-shaped slot in its periphery, jigs positioned around the periphery of the table, and clamping bolts on the jigs engaging the T-shaped slot for adjustably clamping them in place.

In testimony whereof I affix my signature in presence of two witnesses.

FRANK M. DAVIS.

Witnesses:
R. S. C. CALDWELL,
H. D. CHASE.